United States Patent [19]
Potier

[11] Patent Number: 5,868,197
[45] Date of Patent: Feb. 9, 1999

[54] DEVICE FOR ELECTRICALLY CONNECTING UP A MOTOR/FAN UNIT FOR A MOTOR VEHICLE HEAT EXCHANGER

[75] Inventor: Michel Potier, Rambouillet, France

[73] Assignee: Valeo Thermique Moteur, La Verriere, France

[21] Appl. No.: 793,243
[22] PCT Filed: Jun. 18, 1996
[86] PCT No.: PCT/FR96/00937

§ 371 Date: Feb. 21, 1997

§ 102(e) Date: Feb. 21, 1997

[87] PCT Pub. No.: WO97/01070

PCT Pub. Date: Jan. 9, 1997

[30] Foreign Application Priority Data

Jun. 22, 1995 [FR] France .................................. 95 07511

[51] Int. Cl.⁶ ........................................................ F28F 7/00
[52] U.S. Cl. ..................................... 165/121; 174/117 FF
[58] Field of Search .......................... 174/117 F, 117 FF; 165/121, 122

[56] References Cited

U.S. PATENT DOCUMENTS

| | | |
|---|---|---|
| 3,061,277 | 10/1962 | Anderson .......................... 165/121 X |
| 3,324,938 | 6/1967 | Berkoff . |
| 4,210,833 | 7/1980 | Neveux ................................ 165/121 X |
| 4,664,459 | 5/1987 | Flanagan et al. ............. 174/117 FF X |
| 4,832,621 | 5/1989 | Asai et al. ..................... 174/117 FF X |
| 5,002,019 | 3/1991 | Klaucke et al. . |
| 5,083,238 | 1/1992 | Bousman ....................... 174/117 FF X |

FOREIGN PATENT DOCUMENTS

| | | |
|---|---|---|
| 186581 | 7/1986 | European Pat. Off. . |
| 316137 | 5/1989 | European Pat. Off. . |
| 2 573 128 | 5/1986 | France . |
| 101008 | 4/1991 | Japan ................................. 174/117 F |

Primary Examiner—Leonard R. Leo
Attorney, Agent, or Firm—Morgan & Finnegan L.L.P.

[57] ABSTRACT

A device for electrically connecting a motor-fan unit mounted on the body of a heat exchanger. The connecting device includes an elongate bar that may be placed flat along the large side of the exchanger body and consists of an insulating core in which at least two electrical conductors are embedded, a first plug connector arranged at one end of the bar for connection to a plug connector of the electric motor of the motor-fan unit, and a second plug conenctor arranged at the other end of the bar for connection to a plug connector of an electrical control circuit. The device may be used in motor vehicles.

19 Claims, 2 Drawing Sheets

DEVICE FOR ELECTRICALLY CONNECTING UP A MOTOR/FAN UNIT FOR A MOTOR VEHICLE HEAT EXCHANGER

The invention relates to a device for electrically connecting up a motor/fan unit mounted on the body of a heat exchanger, particularly of a radiator used to cool the combustion engine of a motor vehicle.

It applies particularly to the electric connecting-up of a motor/fan unit comprising an electric motor fixed to the body of the heat exchanger and driving a fan arranged facing a large face of the finned body.

A heat exchanger of this type is already known, from the publication of French Patent No. 2 573 128.

In such a heat exchanger, the electric motor of the motor/fan unit is fixed directly to the body of the heat exchanger, which is contrary to the conventional solutions in which this motor is fixed either to the heat exchanger by means of cross members or to the bodywork or to the chassis of the vehicle.

This results especially in a reduction of the bulk of the heat exchanger/motor/fan unit assembly, in a reduction of the vibrations generated by the fan and in better flow of the air passing through the finned body.

However, in a heat exchanger according to the aforementioned publication, the motor is arranged between the fan and a large face of the body of the heat exchanger, and this presents a problem in the electrical connecting-up of the motor/fan unit by comparison with the traditional solutions in which the motor of the motor/fan unit lies on the other side of the fan with respect to the finned body.

To solve this problem the Applicant Company has already conceived a number of solutions which consist in making a bundle of electric cables run along at least part of the large face of the body of the exchanger, and in keeping this bundle pressed against the finned body so that it is completely out of contact with the fan, as taught in French Patent Application No. 95 01044 (unpublished).

The invention has just brought another solution to this problem by proposing a connection device which offers easier assembly and avoids any risk of the electric wires being cut.

For this purpose it proposes a connecting-up device of the type defined in the introduction, which comprises an elongate strip capable of being laid out flat along the large face of the body and is formed of an insulating core in which at least two electric conductors are embedded, a first connector provided at a first end of the strip and capable of being connected up to a connector of the electric motor, and a second connector provided at a second end of the strip and capable of being connected up to a connector of an electric control circuit.

Thus a device is obtained which can easily be connected both to the electric motor of the motor/fan unit and to the electric control circuit.

Furthermore, the electric conductors are embedded in an insulating core which acts as an extension piece between the two connectors and they are thus protected.

In this way any risk of the electric conductors being cut or damaged either as a result of accidental contact with the fan or as a result of rubbing caused by the body of the exchanger, which usually comprises fins with sharp edges is avoided.

According to another feature of the invention, the strip together with the first connector and the second connector form a single-piece assembly.

Advantageously, the strip has a cross section in the overall shape of a flattened rectangle of small thickness, the electric conductors being embedded within the thickness of the strip.

Advantageously, the electric conductors are produced in the form of flattened blades, which makes them easier to integrate into the thickness of the strip.

The invention also makes provision for the strip to be fitted with a stiffening rib which stretches along at least part of its length and which points in a direction perpendicular to the plane of the large face.

As a preference, this rib has a height which decreases from the first connector in the direction of the second connector and which has a minimum value at the periphery of the fan.

Thus there is no risk of this rib impairing the passage of the fan, which generally comprises a peripheral shroud.

According to another feature of the invention, the first connector is capable of being coupled with the connector of the motor in a direction which is radial with respect to the axis of rotation of the fan, and parallel to the plane of the large face.

Advantageously this first connector includes two male pins surrounded by an insulating sleeve integral with the strip.

According to another feature of the invention, the second connector is capable of being coupled with the connector of the electric circuit in a direction which is perpendicular to the plane of the large face.

Advantageously, this second connector includes two male pins surrounded by an insulating sleeve integral with the strip.

The invention furthermore makes provision for the strip to include, close to the second connector, a through-hole intended for the passage of a fastening means making it possible to secure the strip to the body of the heat exchanger.

In an alternative form of the invention, the connecting-up device comprises an electric resistor mounted between one of the electric conductors and an intermediate pin of the second connector and arranged in the zone in which the fan moves.

The result of this is that the electric resistor which makes it possible to vary the speed of the motor/fan unit is arranged in the zone in which the fan moves, which facilitates its cooling.

In the description which follows, given merely by way of example, reference is made to the appended drawings, in which.

Figure 1:
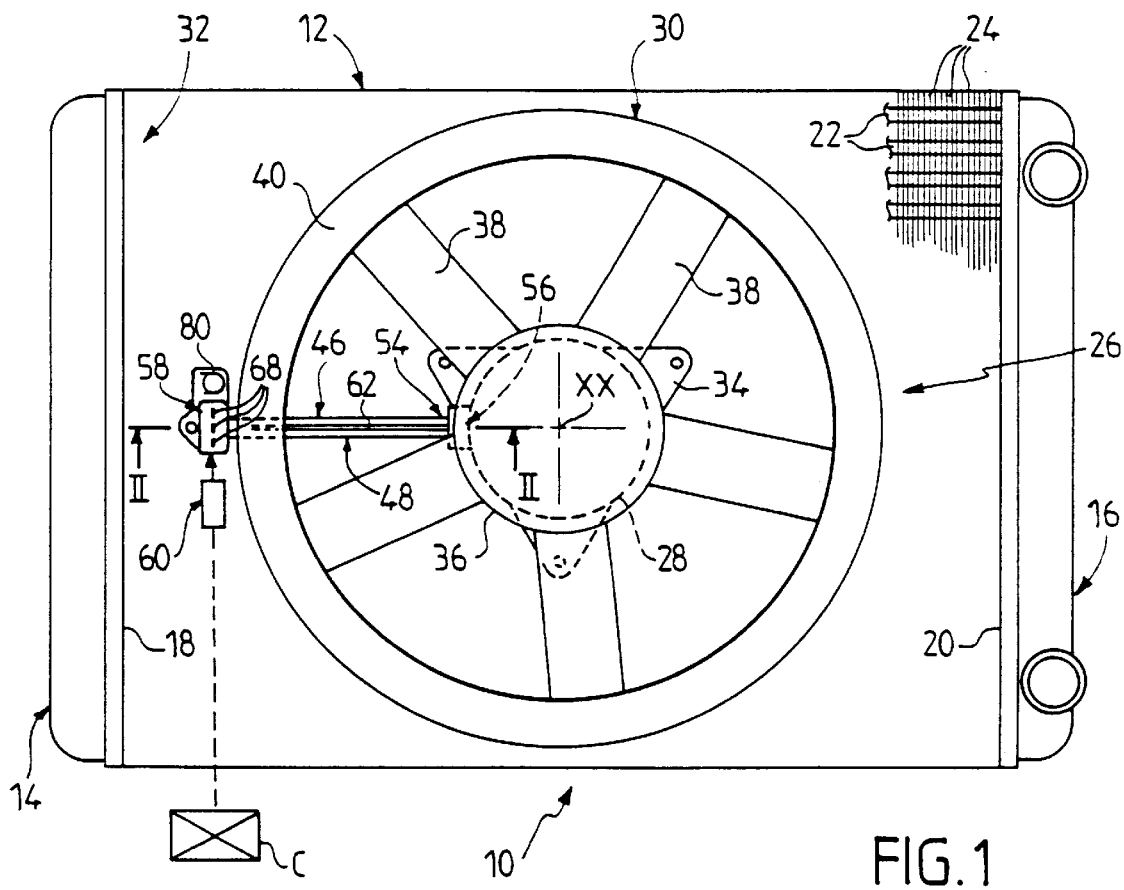
FIG. 1 is a view in plan of a heat exchanger equipped with a motor/fan unit and with a device for electric connecting-up according to the invention.

Reference is first of all made to FIG. 1 which represents a heat exchanger 10 such as a radiator used to cool the combustion engine of a motor vehicle.

The exchanger 10 comprises a body 12 mounted between two water boxes 14 and 16 via two manifold plates 18 and 20. The body 12 consists of a bundle of tubes 22 passing through a great many fins 24 and the ends of which are received in leaktight fashion in the manifold plates 18 and 20.

The fins 24 are, in the example represented, slender metal plates of rectangular overall shape which are arranged so that they are mutually parallel and perpendicular to the axes of the tubes 22.

Mounted directly on the body 12 is a motor/fan unit 26 comprising an electric motor 28 supplying rotational drive about an axis XX to a fan 30. The fan 30 is arranged facing a large face 32, of rectangular overall shape, of the body 12, which extends between the manifold plates 18 and 20.

The motor 28 is integral with a triangular mount 34, which is fixed to the body 12 by appropriate means which may, for example, be those described in the aforementioned publication of French Patent No. 2 573 128.

The fan 30 comprises a hub 36 set on the shaft of the motor 28 and joined by radial blades 38 to a shroud 40 of circular overall shape. The shroud 40 which constitutes the perimeter of the fan has a profile with a shape (FIG. 2) chosen to route an air flow F which passes through the heat exchanger from a large face 42 of the body 12 to leave via the other face 32.

Figure 2:
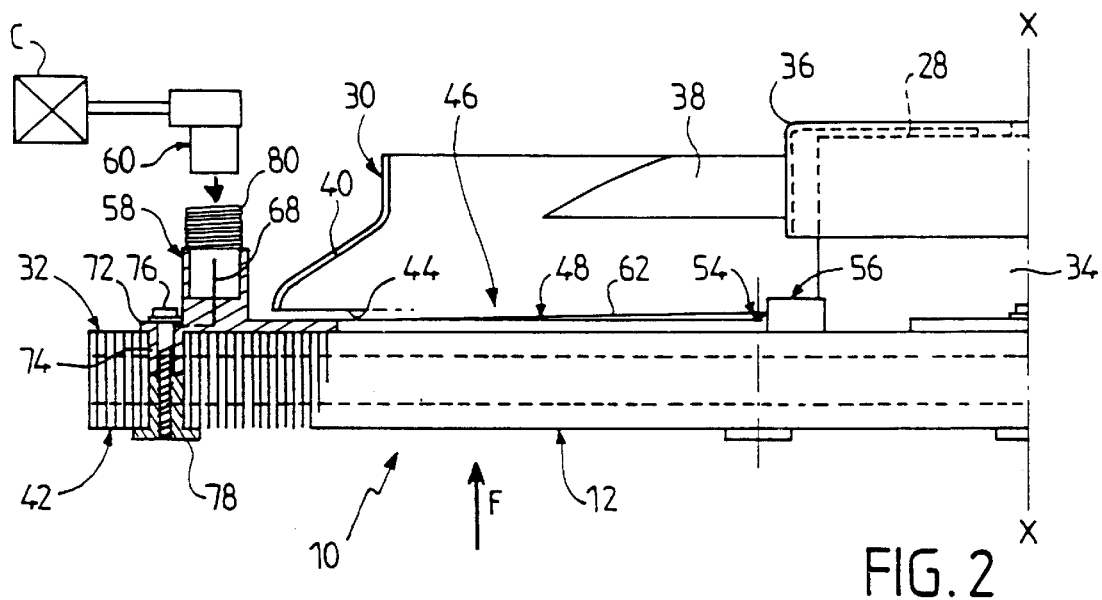
FIG. 2 is a view in part section, on an enlarged scale, on the line II-II of FIG. 1.

As can be seen in FIG. 2, the shroud 40 includes an annular rim 44 which is situated opposite and a small distance away from the face 32.

The electric motor 28 is connected to a control circuit C (FIGS. 1 and 2) by an electric connecting-up device 46 according to the invention.

Figure 3:
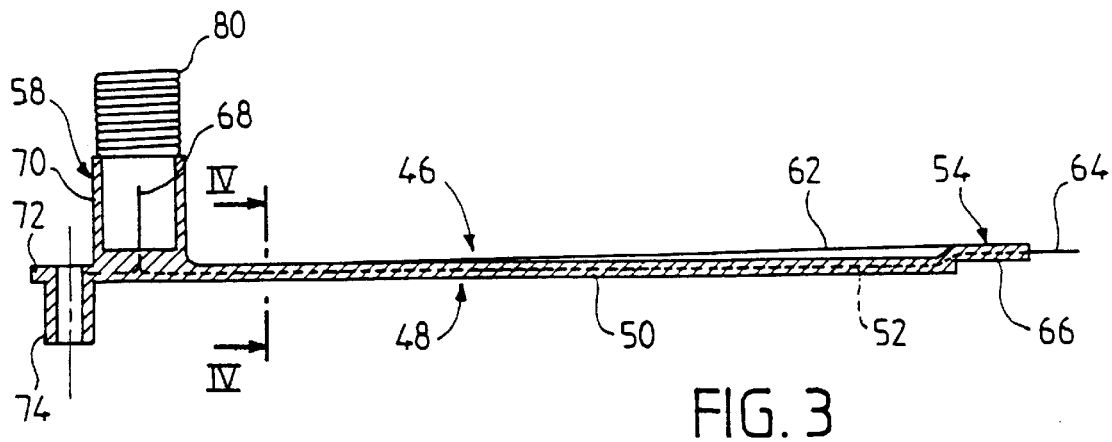
FIG. 3 is a view in longitudinal section of the connecting-up device of FIGS. 1 and 2.
Figure 4:
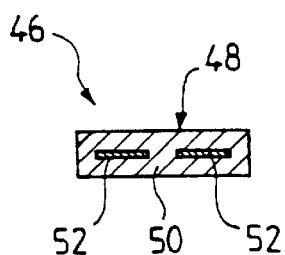
FIG. 4 is a view in transverse section on an enlarged scale on the line IV—IV of FIG. 3.

The device 46 comprises an elongate strip 48 capable of being laid out flat along part of the large face 32 of the body 12 and formed of an insulating core 50 in which two electric conductors 52 are embedded (FIGS. 3 and 4). In the example, the overall direction of the strip is parallel to the tubes 24, and therefore perpendicular to the fins 24. The core 50 of the strip 48 has a transverse section in the overall shape of a flattened rectangle of small thickness (FIG. 4) so that it takes up the minimum amount of space between the large face 32 and the rim 44 of the fan (FIG. 2).

The electric conductors 52 are produced in the form of two flattened blades arranged parallel to each other and embedded within the thickness of the core 50 (FIG. 4).

The connecting-up device 46 furthermore comprises a first connector 54 (FIGS. 1 to 3) provided at a first end of the strip and capable of being connected up to a connector 56 provided on the support 34 in order to set up an electrical connection with the electric motor 28.

The connecting-up device 46 furthermore comprises a second connector 58 (FIGS. 1 to 3) capable of being connected up to a connector 60 (FIGS. 1 and 2) itself linked to the electric control circuit C.

Thus the connectors 54 and 56 act as two half connectors which, once coupled together, provide an electrical connection between the two conductors 52 and the electric motor 28.

Likewise, the two connectors 58 and 60 act as two half connectors which, once coupled together, provide an electrical connection between the two conductors 52 and the circuit C.

The strip 48 is fitted with a stiffening rib 62 (FIGS. 1 to 3) which stretches along at least part of its length and which points in a direction perpendicular to the plane of the large face. This rib has a height which decreases progressively from the first connector 54 in the direction of the second connector 58 and which has a minimum value at the periphery of the fan, that is to say in the region of the edge 44 of the shroud 50 [sic].

The rib 62 contributes to holding the strip 48 pressed tightly against the large face 32 of the body of the heat exchanger.

The first connector 54 has two male pins 64 (FIG. 3) which extend parallel to the longitudinal direction of the strip 48 so as to allow the first connector 54 to be coupled with the connector 56 in a direction which is radial with respect to the axis of rotation XX of the fan and parallel to the plane of the large face 32.

The first connector 54 is a connector of the male type and its two pins 64 hang down from an insulating sleeve 66 integral with the strip 48. As a preference the sleeve 66 is molded integrally with the strip 48.

The second connector 58 is also a connector of the male type. It comprises, in the example, three male pins 68 extending in a direction which overall is perpendicular to the strip 48, that is to say perpendicular to the plane of the large face 32.

The pins 68 are surrounded by a sleeve 70 (FIGS. 3 and 5) which is integral with the strip 48 and is preferably molded integrally with it.

The strip 48 is extended, beyond the connector 58, by a tab 72 equipped with a sleeve tube 74 (FIG. 3) allowing the passage of a fastener for securing the strip 48 to the body of the exchanger. This fastening means is produced in the form of a screw 76 which passes through the sleeve tube 74 and the thickness of the body 12 and is then held by a nut 78 (FIG. 2).

Thus when the connector 54 is coupled with the connector 56 and the fastening screw 76 is fitted, the connecting-up device is held in position against the large face 32 of the heat exchanger, thus safeguarding the strip 48 against any contact with the fan and against any vibrational contact with the body 12.

The connector 58 is outside the zone of action of the fan and is linked to the control circuit C by the connector 60.

The connecting-up device 46 of the invention thus forms a single-piece assembly which can easily be connected up to the electric motor 28 and to the control circuit C.

Figure 5:
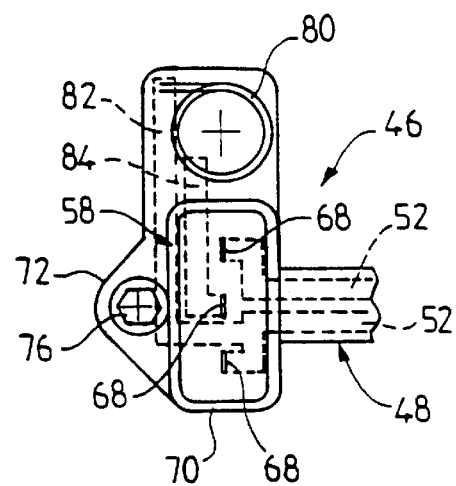
FIG. 5 is a partial view from above of a connecting-up device in an alternative form.

The connecting-up device 46 furthermore includes an electric resistor 80, in the example a wound resistor, situated close to the connector 58. This resistor 80 is linked via an electrical connection 86 to one of the pins 68 (+pole) which is itself linked to one of the conductors 52 (FIG. 5). The resistor 80 is furthermore linked via an electrical connection 84 to another pin 68 (+pole) situated at an intermediate position of the connector, and not linked to the conductors 52. The last pin 68 (−pole) is linked to the other conductor 52.

When the control circuit is linked to the two outermost pins 68, short-circuiting the resistor 80, the motor 28 can be driven at high speed. By contrast, when the circuit C sets up a connection between one of the pins 68 (negative pole) and the intermediate pin 68 (positive pole), then the resistor 80 is in circuit and the motor 28 turns at a lower speed.

As can be seen in FIGS. 1, 2, 3 and 5, the resistor 80 is situated in a position close to the connector 58 and to the zone of action of the fan. This results in better cooling of the resistor.

Of course the invention is not limited to the embodiments described earlier by way of example.

Thus the connector 52 may be produced in the form of a two-pin connector without being linked to an electric resistor, in cases where the motor/fan unit is designed to run at a single speed.

I claim:

1. A device for electrically connecting up a motor/fan unit mounted on the body of a heat exchanger, the motor/fan unit having an electric motor fixed to the body of the exchanger and driving a fan facing a face of the body of the exchanger, comprising:

an elongate strip being laid out flat along a large face of the body, said strip being formed of an insulating core in which at least two electric conductors are embedded, a first connector provided at a first end of the strip and being connected up to a connector of the electric motor, and a second connector provided at a second end of the strip and capable of being connected up to a connector of an electric control circuit.

2. A device according to claim 1, wherein the strip together with the first connector and the second connector form a single-piece assembly.

3. Device according to claim 2 wherein the strip has a cross section in the overall shape of a flattened rectangle of small thickness and in that the electric conductors are embedded within the thickness of the strip.

4. A device according to claim 1 wherein the strip has a cross section in the overall shape of a flattened rectangle of small thickness and wherein the electric conductors are embedded within the thickness of the strip.

5. Device according to claim 4, wherein the electric conductors are produced in the form of flattened blades.

6. A device according to claim 1, wherein the electric conductors are produced in the form of flattened blades.

7. Device according to claim 6, wherein the strip is fitted with a stiffening rib which stretches along at least part of the length of the strip and which points in a direction perpendicular to the plane of the large face of the body of the exchanger.

8. A device according to claim 1, wherein the strip is fitted with a stiffening rib which stretches along at least part of the length of the strip and which points in a direction perpendicular to the plane of the large face of the body of the exchanger.

9. A device according to claim 1, wherein the strip is fitted with a stiffening rib which stretches along at least part of the length of the strip and which points in a direction perpendicular to the plane of the large face of the body of the exchanger and wherein the fan has a periphery and wherein the rib has a height which decreases from the first connector in the direction of the second connector and which has a minimum value at the periphery of the fan.

10. Device according to claim 9, wherein the first connector is coupled with the connector of the electric motor in a direction which is radial with respect to the axis of rotation of the fan, and parallel to the plane of the large face.

11. A device according to claim 1, wherein the first connector is coupled with the connector of the electric motor in a direction which is radial with respect to the axis of rotation of the fan, and parallel to the plane of the large face.

12. A device according to claim 11, wherein the first connector includes two male pins surrounded by an insulating sleeve integral with the strip.

13. Device according to claim 12, wherein the second connector is coupled with the connector of the electric circuit in a direction which is perpendicular to the plane of the large face of the heat exchanger body.

14. A device according to claim 1, wherein the second connector is coupled with the connector of the electric circuit in a direction which is perpendicular to the plane of the large face of the heat exchanger body.

15. A device according to claim 14, wherein the second connector includes two male pins surrounded by an insulating sleeve integral with the strip.

16. A device according to claim 1, wherein the strip includes, adjacent to the second connector, a sleeve tube intended for the passage of a fastening means for securing the strip to the body of the heat exchanger.

17. A device according to claim 16, wherein it comprises an electric resistor mounted between one of the electric conductors and an intermediate pin of the second connector and situated in a position close to an area through which the fan moves.

18. A device according to claim 1, which comprises an electric resistor mounted between one of the electric conductors and an intermediate pin of the second connector and situated in a position close to an area through which the fan moves.

19. A according to claim 1, wherein the second connector is coupled with the connector of the electric circuit in a direction which is perpendicular to the plane of the large face of the heat exchanger body, wherein the second connector includes two male pins surrounded by an insulating sleeve integral with the strip and wherein the strip includes, close to the second connector, a sleeve tube intended for the passage of a fastening means for securing the strip to the body of the heat exchanger.

* * * * *